May 12, 1970     T. HARADEN ET AL     3,511,981
MOVIE LIGHT
Filed March 6, 1968     2 Sheets-Sheet 1
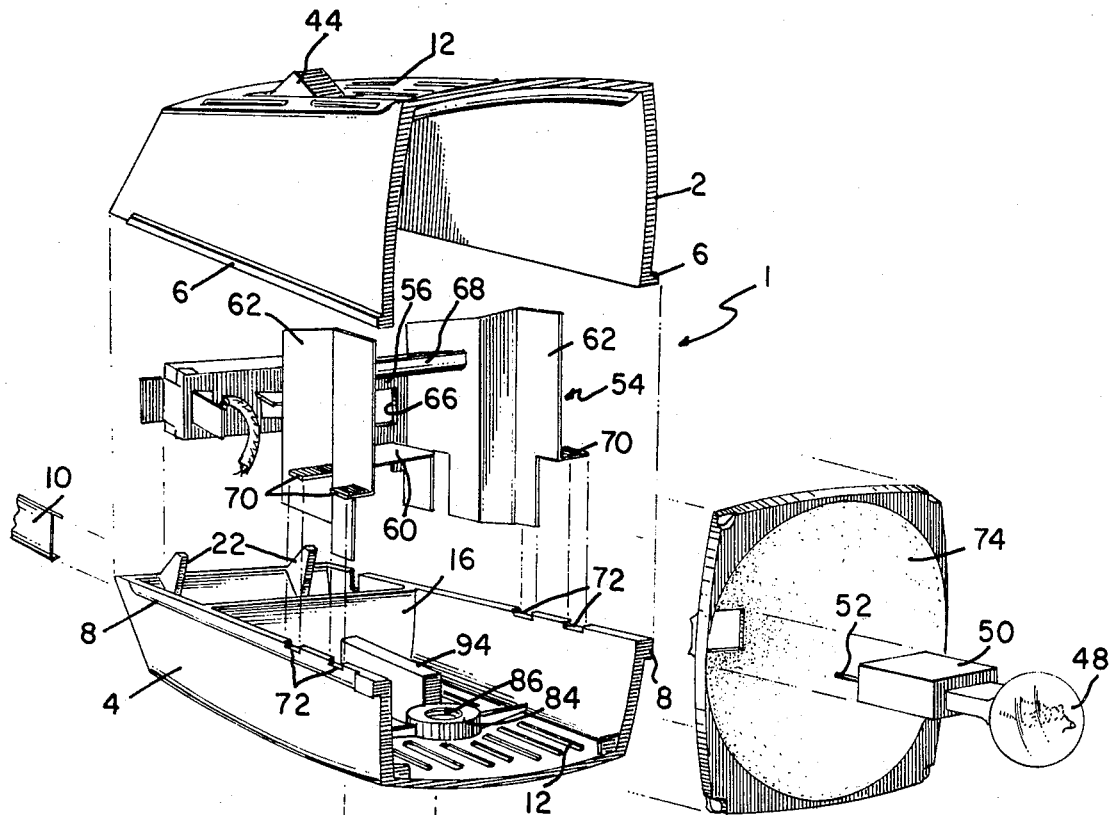
FIG. 1
INVENTORS
HENDRIK A. J. de VOS
THOMAS HARADEN
BY 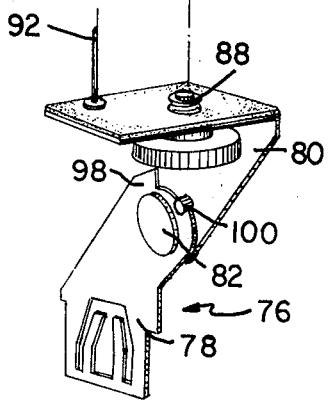
ATTORNEY INVENTORS
HENDRIK A. J. de VOS
THOMAS HARADEN
BY Joseph C. Ryan
ATTORNEY

United States Patent Office 3,511,981
Patented May 12, 1970

1

3,511,981
MOVIE LIGHT
Thomas Haraden, Ipswich, and Hendrik A. J. de Vos,
Wenham, Mass., assignors to Sylvania Electric Products
Inc., a corporation of Delaware
Filed Mar. 6, 1968, Ser. No. 710,964
Int. Cl. G03b 15/02
U.S. Cl. 240—1.3      6 Claims

ABSTRACT OF THE DISCLOSURE

A photographic illuminating device consisting of a housing having upper and lower portions, a baffle member supported in the housing, a reflector element within the housing, and a light source which extends through a central aperture in the reflector toward the front of the housing. The upper and lower portions of the housing have pairs of longitudinally extending flanges which are secured together by clip members. The baffle member has lateral projections thereon which extend between the mating flanges of the housings and are supported thereby. The device is supported on the head of a camera by a two-way adapter mounting bracket which may be inserted into the various types of support elements provided on the head of a camera.

---

This invention relates to auxiliary lighting equipment designed principally for use with photographic apparatus and more particularly for use with motion picture or movie cameras.

In recent years significant improvements have been made in the development of auxiliary lighting equipment for use with movie cameras. For many years this equipment usually consisted of several lamps supported on a common member which had to be held by an assistant to the operator of the movie camera. More recently, with the development of smaller and more powerful lamps, significant improvements have been made in the design and construction of this auxiliary lighting equipment. For example, there is available today a unit, generally called a movie light, consisting essentially of a head containing a single light source, a standard or handle on which this head is mounted and an arm extending laterally from the standard or handle and having means for supporting the camera thereon. Thus with this improvement the number of lamps required has been reduced to one and the need for an assistant to the camera operator has been eliminated.

The principal object of this invention is to effect a further improvement in movie lights.

In accordance with the principles of this invention a movie light is provided which can be mounted directly on the top of a movie camera and which features a two-way adapter bracket designed to fit most Super "8" cameras and automatically position the type A filter located therein. More particularly, the movie light features a head and a reflector which are smaller than any used heretofore and yet a full power (650 watt) light source is used. The use of a full power light source in a reflector and head smaller than any used heretofore has been made possible principally by certain heat dissipation structural features and by the critical positioning of the reflector in the housing.

We have discovered that heat radiation rather than heat conduction is the more critical heat problem. In effecting a satisfactory solution thereof, we have introduced air slots in the bottom and top of the head housing, an air gap around the reflector aperture and a specially designed heat baffle suspended between the abutting longitudinal edges of the two-part housing.

2

The two-way adapter bracket feature of this invention makes it possible for this movie light to be used with most Super "8" cameras designed for a top mounting arrangement of an auxiliary light source. Some of these cameras are designed to receive a spade-shaped flat member which is designed to serve the dual purpose of a mounting means and a means for automatically positioning the type A filter located therein, whereas others are designed for a screw mounting arrangement with a separate member for positioning the filter. The two-way adapter bracket of this invention is provided with a spade-shaped flat member at one end thereof and a screw and filter pin located in a lateral extension which defines the other end thereof. The head of the movie light of this invention is provided with a dual mounting arrangement to receive either end of the two-way adapter bracket, depending upon the particular type of camera with which it is employed.

In the specific embodiment of the invention illustrated in the accompanying drawings, FIG. 1 is an exploded view of a movie light employing the features of this invention.

Figure 2:
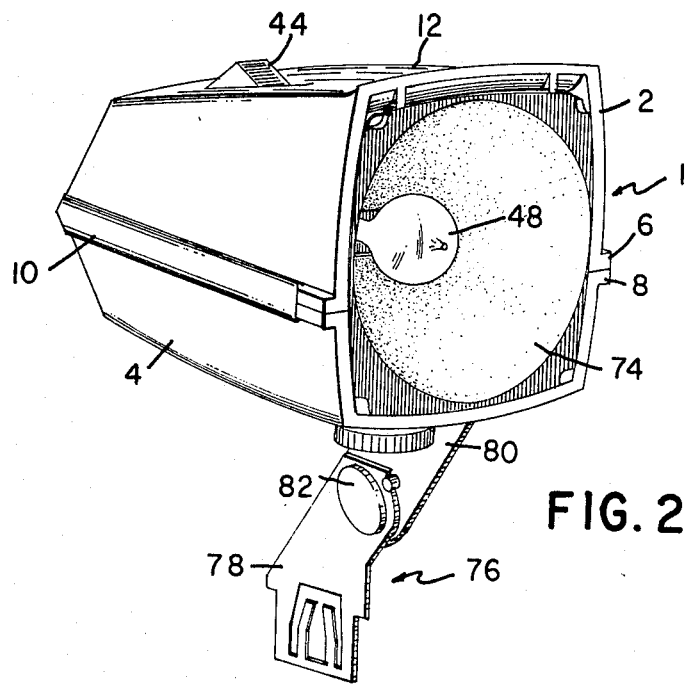
FIG. 2 is a perspective view of the movie light of FIG. 1.

Referring now to the drawings and the specific embodiment of the invention illustrated therein, the movie light head 1 comprises an upper housing 2 and a lower housing 4, the upper housing 2 having a pair of longitudinally extending flanges 6 and the lower housing 4 having a pair of mating longitudinally extending flanges 8. The upper and lower housings are secured to one another to define the unitary head 1 by means of clips 10 which slide over the mating flanges and lock them securely to one another. Because of the heat problems associated with this head, the housing components thereof should be of a heat resistant material, such as for example a heat resistant phenolic moulding compound having a low heat conductivity. Both upper and lower housings 2 and 4 are provided with a plurality of elongated slots 12 which provide for a circulation of air through the head, cool air entering through the slots in the lower housing and being drawn up through the unit and out the slots in the upper housing due to the chimney effect generated by the lamp heat.

Figure 3:
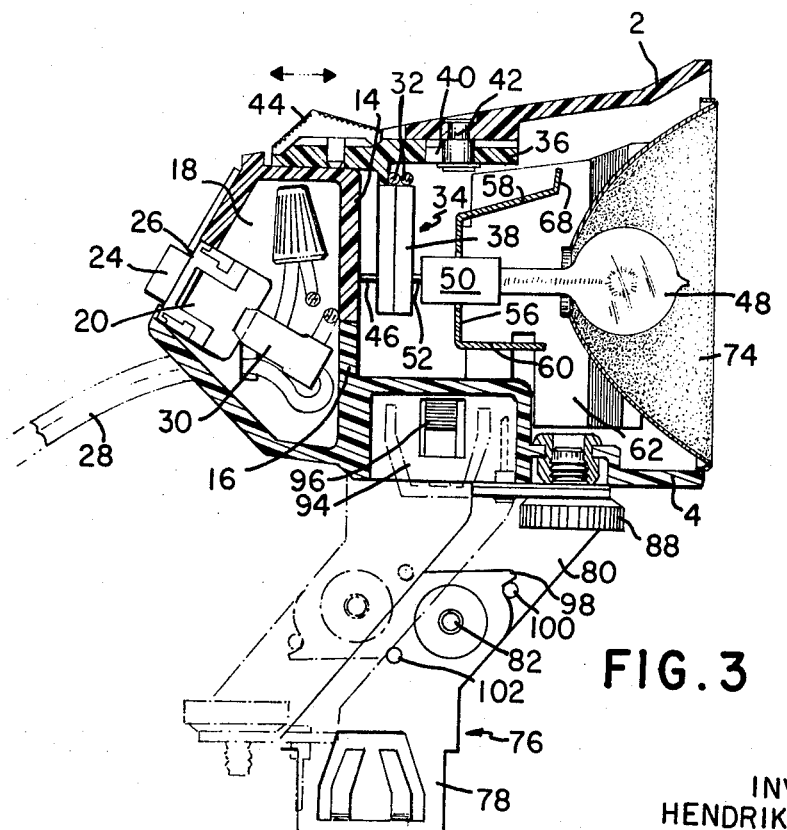
FIG. 3 is a side elevational view of the movie light of FIGS. 1 and 2 with the head thereof being shown in section and with both arrangements of the two-way adapter bracket being shown, one being in solid and the other in phantom.

As shown best in FIG. 3, the upper and lower housings 2 and 4 are each provided with a transverse wall 14 and 16 respectively which, in combination with the inclined rear walls of the housings define a switch chamber 18. A rocker switch 20 is seated on brackets 22 (FIG. 1) provided therefor in the lower housing 4 and the operating button 24 of the switch is exposed for operation by a cutout 26 in the upper housing 2. A line cord 28 enters the lower housing 2 through a slot provided therefor and is connected to a flag terminal 30 of rocker switch 20. Wires 32 run from the rocker switch 20 and the line 28 through a slot provided therefor in transverse wall 14 in the upper housing 2, to a lamp socket assembly 34.

The lamp socket assembly 34 (FIG. 3) is supported by and depends from the inside face of the upper housing 2. The lamp socket assembly 34 comprises a substantially L-shaped base member 36, to the vertical leg of which a lamp socket 38 is attached. The forward end of the horizontal leg thereof is provided with an elongated slot 40 through which the supporting shoulder rivet 42 extends whereas the rearward end thereof is provided with a thumb button 44 for reciprocating the lamp socket assem-

::::::

bly 34 within the limits defined by the elongated slot 40 through which the supporting shoulder rivet 42 extends, the button 44 being exposed by a slot provided therefor molded in the upper housing 2. The rear face of lamp socket 38 is provided with a stop pin 46 which limits the rearward movement thereof. A lamp 48 having a base 50 is mounted in the socket 38 by means of pins 52 extending from base 50 which are inserted into apertures provided therefor in the socket 38. With the foregoing arrangement an operator can adjust the relative location of the lamp 48 within the reflector 74 by operating the thumb button 44. Advancement of the button 44 to the forward limit defined by the elongated slot 40 will advance the lamp 48 forward in the reflector 74 to "Flood" beam whereas retraction of the button to the rear limit will locate the lamp in the "Spot" beam position.

As mentioned above, one of the means employed to solve the heat problem is the use of a specially designed heat baffle suspended between the abutting longitudinal edges of the upper and lower housings. As shown in FIGS. 1 and 3, the baffle 54 is a fabricated piece comprising a rear wall 56, an upper wall 58, a lower wall 60 and a pair of side walls 62. The rear wall 56 is provided with a substantially rectangular slot 66 through which the base 50 of the lamp 48 extends. The lower wall 60 is substantially normal to the rear wall 56. However, the upper wall 58 extends forwardly and upward at an angle and terminates in an upwardly extending lip 68, all designed to give maximum protection against the heat. The side walls 62 are corrugated in part for similar reasons and each side wall is provided with a pair of laterally extending tabs 70 (FIG. 1) which seat in notches 72 provided therefor in the longitudinal flanges of the lower housing 4. Thus the baffle 54 is essentially a "floating" member, spaced on all sides from and shielding the upper and lower housings 2 and 4 from radiated heat, the only points of contact therewith being made by the relatively small tabs 70.

The reflector 74 is press fitted into the front of the head 1 and only the four corners thereof actually make contact. Thus there is an air gap around all four sides of the reflector to aid further in the dissipation of the heat. Another important feature of the reflector mounting is that, as shown particularly in FIG. 3, the reflector 74 protrudes slightly beyond the peripheral edges of the head, thus isolating these areas from the direct heat and light rays of the lamp.

As noted above in the introductory paragraphs, one of the features of this invention is a two-way adapter bracket designed to accommodate most Super "8" cameras. The adapter bracket 76 consists essentially of two members 78 and 80 pivotally connected to one another at 82. Member 78 is the spade member and member 80 is the filter pin member. In some cameras the Type A filter is automatically positioned by a spade and in others by a pin. The two-way adapter bracket of this invention is designed to enable one to use the movie light of this invention with either arrangement. When spade member 78 is to be used to set the camera filter, the two-way adapter bracket 76 is secured to the movie light head 1 as shown in full lines in FIG. 3. When filter pin member 80 is to be used to set the camera filter, the two-way adapter bracket 76 is secured to the movie light head 1 as shown in phantom in FIG. 3.

The lower housing 4 is designed to accommodate both the foregoing arrangements. The lower housing 4 is provided with a boss 84 having a threaded aperture 86 to receive a mounting screw 88 and a bore to receive a filter pin 92 when the head 1 is spade mounted on a camera. The lower housing 4 is also provided with a pocket 94 having a spring-loaded member 96 therein to receive the spade member 78 when the alternative camera mounting arrangement is used.

The overlapping end of each of the members 78 and 80 of the adapter bracket 76 is shaped to define an ear 98 which, in combination with a pin 100 inserted through a cooperating hole 102 in the other of the two members, defines a stop to prevent the movie light head 1 from tilting downwardly below the horizontal.

What we claim is:
1. A movie light comprising:
a head having an upper and a lower housing, each of said housings having a pair of mating longitudinally extending flanges;
a baffle located within said head, said baffle being supported therein by lateral projections thereof extending between said mating flanges;
means for securing said upper and lower housings to one another along their mating longitudinal flanges with said lateral projections of said baffle being located therebetween;
a lamp socket located within said head rearwardly of said baffle;
a lamp mounted in said socket and extending through an aperture provided therefor in said baffle;
a reflector fitted into the front of said head, said reflector having a central aperture through which said lamp extends;
and means for supporting said head on a camera.

2. The combination of claim 1 in which said reflector is fitted into the front of said head with the front peripheral face of said reflector being located forward of the front peripheral edge of said head.

3. The combination of claim 1 in which said means for supporting said head on a camera includes means for positioning a filter in said camera.

4. The combination of claim 3 in which said means for supporting said head on a camera, including means for positioning a filter in said camera, comprises a two-way adapter bracket.

5. The combination of claim 4 in which said two-way adapter bracket comprises a spade member and a filter pin member pivotally connected to one another.

6. The combination of claim 5 in which the lower housing of said head is provided with means for receiving both said spade member and said filter pin member.

References Cited

UNITED STATES PATENTS

| | | | |
|---|---|---|---|
| 3,208,363 | 9/1965 | Easterly et al. | 95—11 |
| 3,325,635 | 6/1967 | Wagner et al. | 240—1.3 |

FOREIGN PATENTS

| | | |
|---|---|---|
| 931,905 | 7/1963 | Great Britain. |

NORTON ANSHER, Primary Examiner

F. L. BRAUN, Assistant Examiner